United States Patent [19]
Okamoto

[11] 3,978,745
[45] Sept. 7, 1976

[54] NUMERICALLY CONTROLLED AUTOMATIC LATHE

[75] Inventor: Shouichi Okamoto, Izumi, Japan

[73] Assignee: Citizen Watch Co., Ltd., Tokyo, Japan

[22] Filed: Sept. 25, 1975

[21] Appl. No.: 616,707

[30] Foreign Application Priority Data
May 27, 1975 Japan.............................. 50-62527
July 1, 1975 Japan........................ 50-92052[U]

[52] U.S. Cl.................................... 82/2 B; 82/19
[51] Int. Cl.² .................... B23B 3/00; B23B 3/28
[58] Field of Search .............. 82/2 R, 2 B, 3, 19

[56] References Cited
UNITED STATES PATENTS

| | | | |
|---|---|---|---|
| 3,308,693 | 3/1967 | Bechler | 82/2 R |
| 3,481,230 | 2/1969 | Horobin | 82/2 B |
| 3,680,415 | 8/1972 | Takano et al. | 82/19 |
| 3,688,612 | 9/1972 | Haruta et al. | 82/19 |
| 3,744,355 | 7/1973 | Filsch | 82/3 |
| 3,827,318 | 8/1974 | Sorenson | 82/19 |
| 3,864,994 | 2/1975 | White | 82/3 |

*Primary Examiner*—Harrison L. Hinson
*Attorney, Agent, or Firm*—Frank J. Jordan

[57] ABSTRACT

A tool actuating mechanism in which first and second main cam shafts are driven by first and second numerically controlled drive means, respectively, and at least one auxiliary cam shaft is selectively engageable with one of the first and second main cam shafts by a clutch means. A plurality of master cams are carried on the first, second and auxiliary cam shafts and a plurality of connecting mechanisms including actuators are associated with the master cams, respectively. The clutch means and the actuators are operable to transmit the motions of selected ones of the master cams carried on the first, second and auxiliary cam shafts to selected ones of a plurality of tool holders, whereby the selected ones of the tool holders are allowed to be concurrently fed toward a workpiece by the first and second drive means at given feed rates.

9 Claims, 18 Drawing Figures

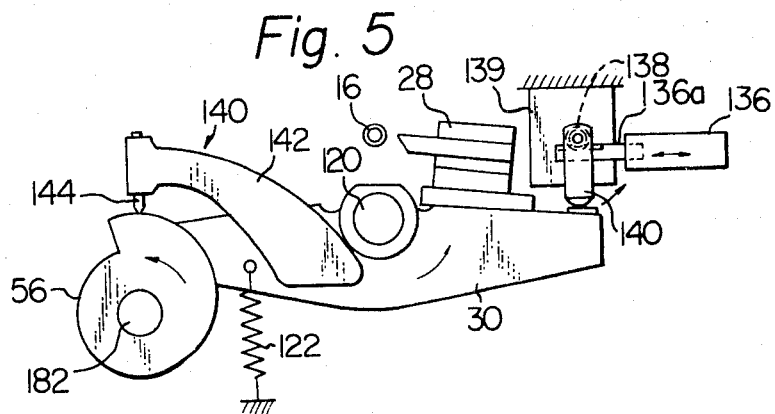
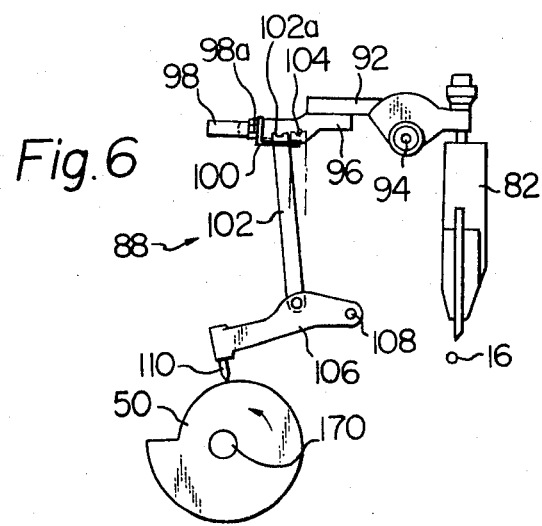
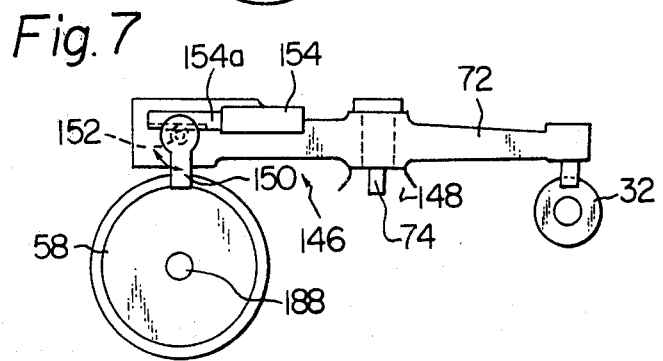

Fig. 15

NUMERICALLY CONTROLLED AUTOMATIC LATHE

This invention relates in general to tool actuating mechanisms for automatic lathes and, more particularly, to an improved tool actuating mechanism for a numerically controlled automatic lathe.

In general, numerically controlled automatic lathes designed for performing machining of workpieces having a larger length to diameter ratio are usually comprised of a horizontally movable headstock having a rotatable spindle to support a workpiece, a plurality of radially movable tool holders movable in a plane perpendicular to and intersecting the axis of the spindle, and a horizontally movable tool holder movable toward and away from the workpiece. The numerically controlled automatic lathes of the slidable headstock type are generally equipped with first and second numerically controlled feed means for feeding the headstock and tool holder in a direction to cut the workpiece into a desired shape on the basis of compound operations of the first and second feed means.

In known automatic lathes of the type described above, it has heretofore been proposed to provide a tool actuating mechanism for automatically actuating one of a plurality of tool holders. The tool actuating mechanism is provided with a plurality of master cams carried on a single cam shaft, which is arranged to be driven by a drive means such as a numerically controlled reversible pulse motor. The tool actuating mechanism also includes a plurality of actuators associated with the master cams so that when one of the actuators is energized, selected one of the tool holders is actuated. This arrangement is particularly advantageous in that selected one of a plurality of tool holders can be automatically actuated in a simple manner without providing any complex construction. However, a problem is encountered with this prior art expedient in that, since the plurality of master cams for actuating the tool holders are carried on the single cam shaft, more than one tool holders can not be concurrently fed toward the workpiece at different feed rates.

It is, therefore, an object of the present invention to provide an improved numerically controlled automatic lathe which can overcome the shortcomings encountered in the prior art automatic lathe.

It is another object of the present invention to provide a numerically controlled automatic lathe having a tool actuating mechanism which improves the operating efficiency of the automatic lathe.

It is another object of the present invention to provide a numerically controlled automatic lathe having a tool actuating mechanism arranged to permit concurrent feeding of more than one tool holders at given feed rates.

It is a further object of the present invention to provide a numerically controlled automatic lathe having a tool actuating mechanism adapted to automatically select one or more than one of a plurality of tool holders in an easy manner.

It is a further object of the present invention to provide a numerically controlled automatic lathe which is arranged to start cutting operations of a workpiece within the shortest period of time by allowing feeding of a tool holder while cutting operation of the workpiece is performed by another tool holder whereby operating efficiency of the lathe is considerably increased.

It is a further object of the present invention to provide a numerically controlled automatic lathe having a tool actuating mechanism which is simple in construction, easy to manufacture and highly reliable in operation.

In order to achieve these objects, the present invention contemplates to provide a numerically controlled automatic lathe arranged to permit selected ones of a plurality of tool holders to be concurrently fed toward a workpiece at given feed rates. To this end, the automatic lathe is provided with first and second main cam shaft and at least one auxiliary cam shaft on which a plurality of master cams having uniform-motion cam lobes for actuating the plurality of tool holders are carried. The first and second main cam shafts are connected to and driven by first and second numerically controlled drive means, respectively. A clutch means is provided for selectively connecting the auxiliary cam shaft to one of the first and second main cam shafts so that the auxiliary cam shaft is driven by one of the first and second numerically controlled drive means. A plurality of actuating means are provided and associated with the clutch means to drivably connect selected ones of the master cams carried on the first and second cam shafts to corresponding ones of the tool holders for thereby allowing the selected ones of the plurality of tool holders to be concurrently fed by the first and second drive means at given feed rates.

These and other objects, features and advantages of the present invention will become more apparent from the following description when taken in conjunction with the accompanying drawings, in which:

FIGS. 3 through 7 are schematic views illustrating operating conditions of connecting mechanisms associated with a plurality of tool holders forming part of the automatic lathe shown in FIG. 2;

Figure 15:
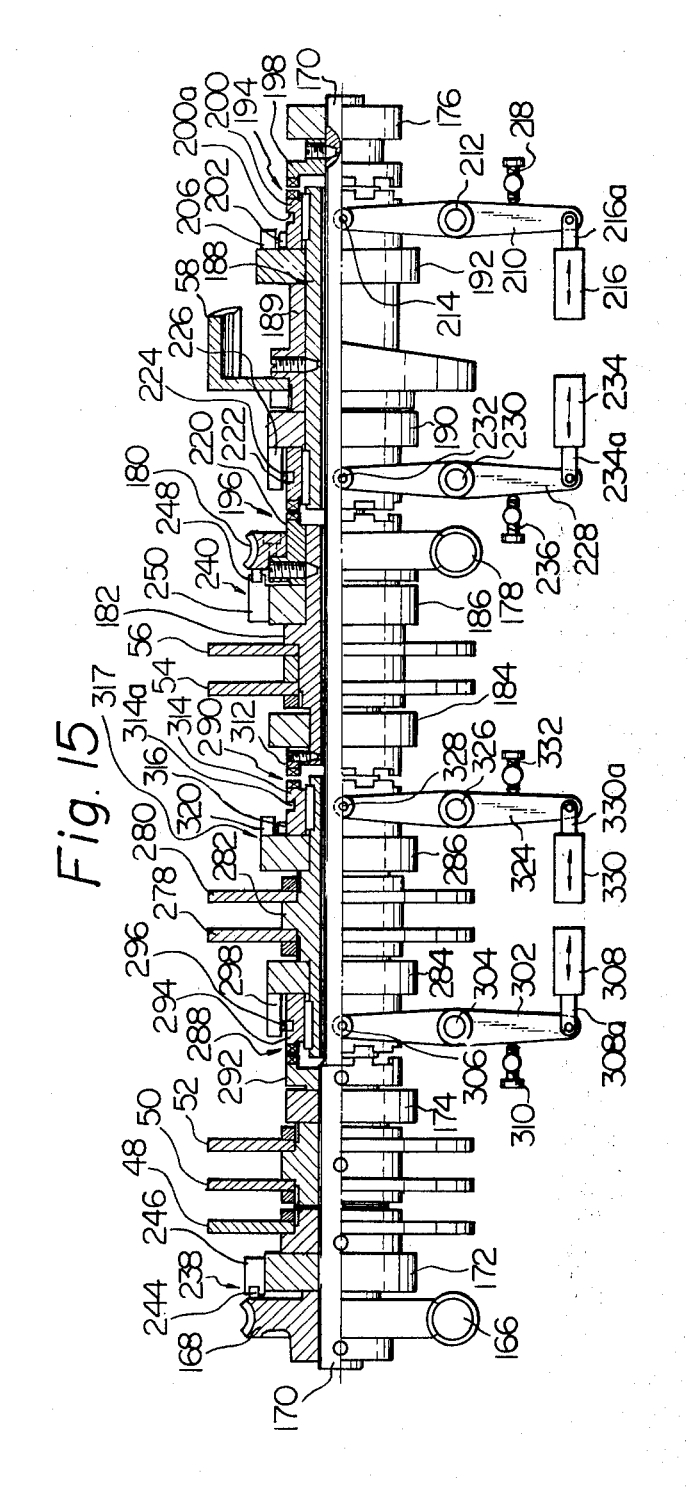

FIG. 15 is a schematic view, partly in cross section, of driven means forming part of the automatic lathe shown in FIG. 14.

Figure 1:
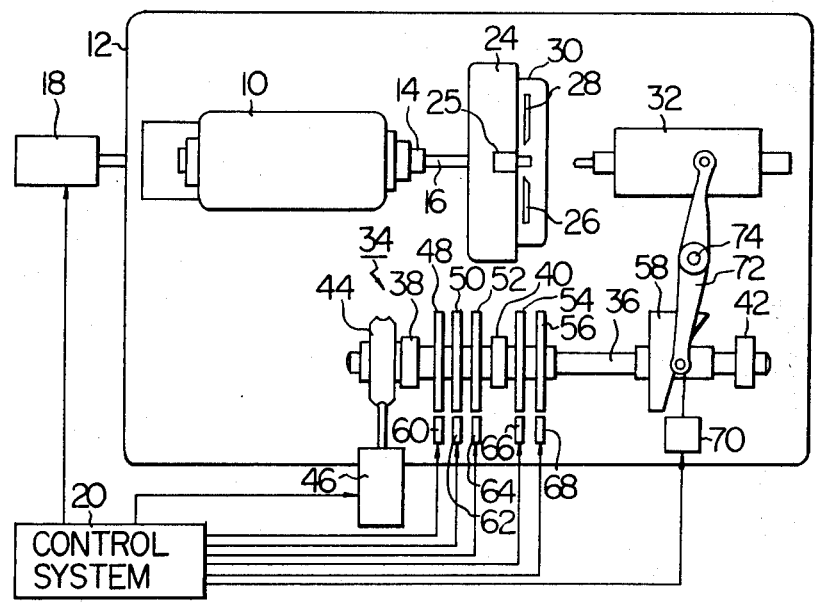
FIG. 1 is a schematic view of an example of a prior art numerically controlled automatic lathe having a tool actuating mechanism.

Referring now to FIG. 1, there is schematically shown an example of a prior art numerically controlled automatic lathe having a horizontally movable headstock 10. The headstock 10 is slidably disposed on horizontal guideways (not shown) provided on a bed 12 and has a rotatable spindle 14 to support a workpiece 16. Rotation of a lead screw (not shown) connected to the headstock 10 produces rightward or leftward movements of the headstock 10 as viewed in FIG. 1. A numerically controlled feed means such as pulse motor 18 is arranged to controllably rotate the lead screw in response to a control signal received from a control system 20. The control system 20 is well known in the art and, therefore, a detail description of the same is herein omitted for the sake of simplicity of description.

A tool carrier 24 extends perpendicular to the axis of the spindle 14 in front of the headstock 10 and carries three individual radially movable tool holders (not shown) which are slidably disposed on guides (not shown) provided on the tool carrier 24. A guide bush 25 is supported by the tool carrier 24 to support the workpiece 16. Another set of radially movable tool holders 26 and 28 are fixed on a rocking arm 30 provided in front of the tool carrier 24. A tool holder 32 is also provided in opposed position of the tool carrier 24 and arranged to be horizontally movable toward and away from the workpiece 16 along the axis of the spindle 14.

In order to actuate a plurality of tool holders, a tool actuating mechanism 34 is provided which comprises a common cam shaft 36 extending parallel to the axis of the spindle 14. The cam shaft 36 is rotatably supported on bearings 38, 40 and 42 mounted on a suitable part of the bed 12 and carries at its one end a worm gear assembly 44 drivably connected to a reversible pulse motor 46. The reversible pulse motor 46 is numerically controlled in response to a numerical control signal received from the control system 20 to rotate the cam shaft 36 in a normal or reverse direction. The cam shaft 36 carries thereon a plurality of master cams 48, 50, 52, 54, 56 and 58 having uniform-motion cam lobes, respectively, and corresponding to the plurality of tool holders. The master cams 48, 50, 52, 54, 56 and 58 have uniform-motion cam lobes to control the amount of feed of the tool holders in proportion to the rotational angles of the master cams, and are associated with electrically controlled actuators 60, 62, 64, 66, 68 and 70. The actuators 60, 62, 64, 66 and 68 are arranged to be energized in response to actuating signals received from the control system 20. The actuator 70 is also energized by an actuating signal received from the control system 20 so that a driving power is transmitted to the horizontally movable tool holder 32 by means of an arm lever 72 which is pivotally mounted as at 74 on the suitable part of the bed 12. With this arrangement, one of the tool holders is actuated by energizing corresponding one of the actuators 60, 62, 64, 66, 68 and 70 in response to a given actuating signal generated by the control system 20. After cutting operation has been completed, the motor 46 is energized to rotate the cam shaft 36 in the reverse direction so that the tool holder is returned to its original or starting position. After one of the tool holders has been returned to its original position, next one of the tool holders may be actuated to perform next cutting operation by energizing the motor 46 so as to rotate the cam shaft 36 in its normal direction. It will thus be seen that the prior art tool actuating mechanism is highly desirable in automatically selecting one of a plurality of cutting tools. As already discussed hereinabove, however, the prior art tool actuating mechanism has disadvantages in that it is difficult to concurrently actuate more than one tool holders.

The present invention contemplates to provide a numerically controlled automatic lathe having an improved tool actuating mechanism which is capable of concurrently feed more than one tool holders at given feed rates and increases the operating efficiency of the automatic lathe.

Figure 2:
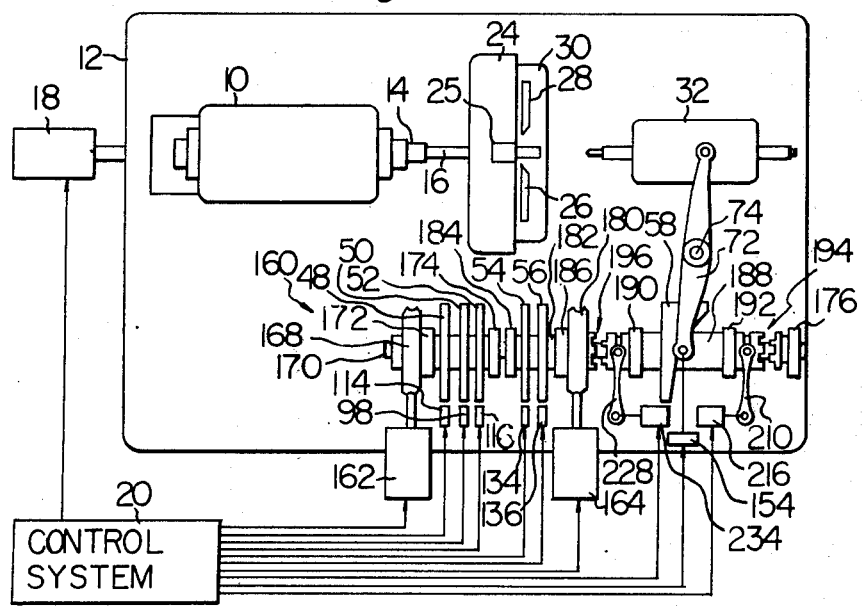
FIG. 2 is a schematic view of a preferred embodiment of a numerically controlled automatic lathe according to the present invention.

A preferred embodiment of the automatic lathe achieving the above concept is illustrated in FIGS. 2 through 13 in which like or corresponding component parts are designated by the same reference numerals as those used in FIG. 1. As shown in FIG. 2, the numerically controlled automatic lathe of the present invention comprises the horizontally movable headstock 10 having the rotatable spindle 14 to support the workpiece 16. The headstock 10 is fed on a numerically controlled basis by the numerically controlled pulse motor 18 which is electrically connected to the control system 20. The automatic lathe further comprises a plurality of tool holders movable toward and away from the workpiece 16, and a tool actuating mechanism which will be discribed in detail hereinafter.

Figure 3:
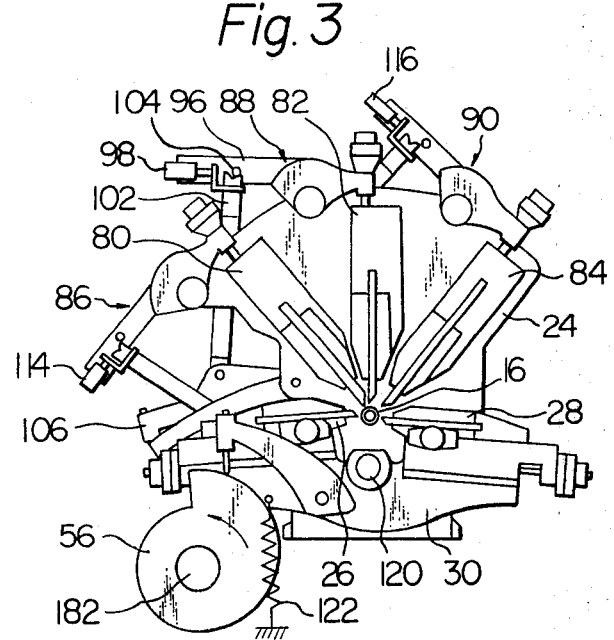

In FIG. 3, there is shown three individual vertically movable tool holders 80, 82 and 84 slidably mounted on the tool carrier 24 to be radially movable toward the workpiece 16. These tool holders 80, 82 and 84 are operatively associated with radially extending guides (not shown), respectively, and independently actuated by connecting mechanisms 86, 88 and 90. An example of the connecting mechanism 88 is shown in FIG. 6. As shown, the connecting mechanism 88 is comprised of a lever 92 which is supported on a pivot pin 94 connected to the tool carrier 24 and which bears at its one end against the tool holder 82. An arm 96 is secured to another end of the lever 92 and supports an actuator such as solenoid 98. The solenoid 98 has a movable plunger 98a connected to an L-shaped actuating plate 100 having a guide slot in which an upper end 102a of a connecting rod 102 is freely movable. The actuating plate 100 is movable to bring the upper end 102a of the connecting rod 102 into or out of engagement with a pin 104 fixed to the arm 96. The connecting rod 102 is pivotally connected at its lower end to a cam lever 106 which is supported by a pivot pin 108 connected to the tool carrier 24. The cam lever 106 has a cam follower 110 held in engagement with the master cam 50. With this arrangement, when the solenoid 98 is de-energized, the plunger 98a is retracted to bring the upper end 102a of the connecting rod 102 out of engagement with the pin 104 as shown by a solid line in FIG. 6. However, when the solenoid 98 is energized in response to an actuating signal from the control system 20, the plunger 98a protrudes to move the actuating plate 100 rightward as viewed in FIG. 6 so that the upper end 102a of the connecting rod 102 is brought into engagement with the pin 104 as shown by phantom line in FIG. 6 and, therefore, the motion of the master cam 50 is transmitted to the lever 92 for thereby actuating the tool holder 82. The solenoid 98 is thus controlled in response to the actuating signal received from the control system 20. Similarly, the connecting mechanisms 86 and 90 include actuators such as solenoids 114 and 116, respectively, which are energized in response to actuating signals received from the control system 20. The other parts of the connecting mechanisms for the tool holders 86 and 90 are identical to that shown in FIG. 6 and, therefore, a detail description of the connecting mechanisms 86 and 90 is herein omitted.

Figures 4, 4A:
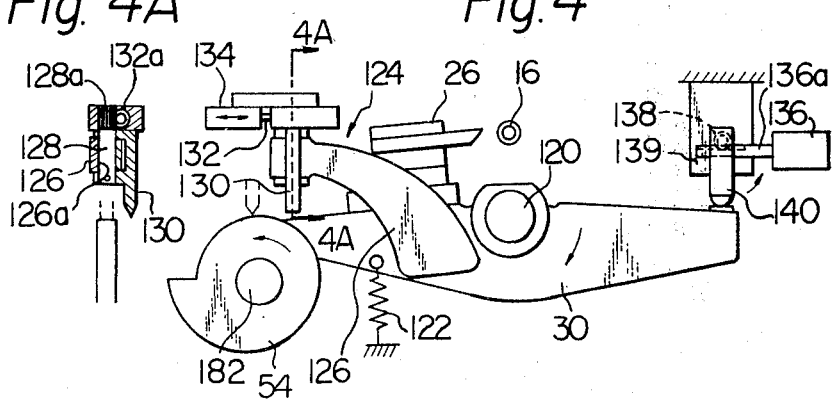

The tool holder 26 and its connecting mechanism are shown in FIGS. 4 and 4A in which the tool holder 28 and its connecting mechanism are omitted for the sake of simplicity of illustration. As shown, the rocking arm 30 is rockably supported on a shaft 120 and is forcibly urged in a counter-clockwise direction by means of a spring 122. The connecting mechanism which is generally designated as 124 comprises a lever 126 fixedly secured at its one end to the rocking arm 30. AS best shown in FIG. 4A, the lever 126 is formed with a vertical bore 126a in which a shaft 128 is rotatably disposed. A cam follower 130 is fixed to the shaft 128 and rotatable therewith. The shaft 128 is provided at its upper end with a pinion 128a meshing with a rack portion 132a formed on a movable plunger 132 of an actuator such as a solenoid 134. The solenoid 134 is energized in response to an actuating signal from the control system 20. With this arrangement, when the solenoid 134 is de-energized, the plunger 132 is retracted so that the cam follower 130 is held out of engagement with the master cam 54 as shown by a solid line in FIGS. 4 and 4A. However, when the solenoid 134 is energized in response to the actuating signal from the control system 20, the plunger 132 protrudes to rotate the shaft 128 in a direction to bring the cam follower 130 into engagement with the master cam 54 as shown by broken line in FIGS. 4 and 4A. An actuator such as a solenoid 136 is also provided which includes a movable plunger 136a formed with a rack portion meshing with a pinion 138 rotatably supported by a block 139 and fixed to an adjusting member 140. The adjusting member 140 serves as a stop limiting the counter-clockwise movement of the rocking arm 30. The solenoid 136 is connected to the control system 20 and energized in response to an actuating signal received therefrom. Normally, the solenoid 136 is de-energized so that the plunger 136a protrudes for thereby maintaining the stop 140 in its operative position as shown in FIG. 4. However, if the solenoid 136 is energized in response to the actuating signal from the control system 20, the plunger 136a is retracted to rotate the pinion 138 counter-clockwise and, therefore, the stop 140 is rotated counter-clockwise and held in its inoperative condition.

A connecting mechanism 140 for the tool holder 28 is shown in FIG 5, in which the tool holder 26 and its connecting mechanism 124 are omitted for the sake of simplicity of illustration. As shown, the connecting mechanism 140 associated with the actuator or solenoid 136 is merely constituted by a lever 142 fixedly connected to the rocking arm 30, and a cam follower 144 which is forcibly resiliently retained in engagement with the master cam 56 by means of the spring 122. Thus, when the master cam 56 is rotated counter-clockwise, the rocking arm 30 is rotated counter-clockwise as shown by an arrow in FIG. 5 and, therefore, the tool holder 28 is fed toward the cutting point of the workpiece 16. It should be noted in this instance that the actuator 136 is energized in response to the actuating signal from the control system 20 and, consequently, the stop 140 is rotated to its inoperative position to allow the right end of the rocking arm 30 to be freely movable upward. When it is desired to stop feeding of the tool holder 28, the solenoid 136 is de-energized so that the plunger 136a protrudes to rotate the pinion 138 in a direction to rotate the stop 140 to its operative position in which the end of the stop 140 is held in a position to limit the upward movement of the right end of the rocking arm 30.

FIG. 7 illustrates a connecting mechanism 146 for the tool holder 32. The connecting mechanism 146 is comprised of the arm lever 72 supported by the pivot pin 74 carried by a frame 148 provided on the bed 12 and rotatable in a horizontal plane. The arm lever 72 engages at its one end with the tool holder 32 and carries at its another end a movable cam follower 150. The cam follower 150 is fixed to a pinion 152 and rotatable therewith in clockwise or counter-clockwise direction as shown by arrows in FIG. 7. The pinion 152 meshes with a rack portion formed on a plunger 154a of an actuator such as a solenoid 154, which is energized in response to an actuating signal received from the control system 20. When it is desired to actuate the tool holder 32, the solenoid 154 is energized so that the plunger 154a protrudes thereby rotating the pinion 152 counter-clockwise by which the cam follower 150 is rotated to a position to engage with the master cam 58 as shown in FIG. 7. In this instance, the arm lever 72 is actuated by the master cam 58 so that the tool holder 32 is movable along the axis of the spindle 16 (see FIG. 2). When the solenoid 154 is de-energized, the plunger 154a is retracted so that the pinion 152 is rotated clockwise to bring the cam follower 150 out of engagement with the master cam 58.

Figure 8:
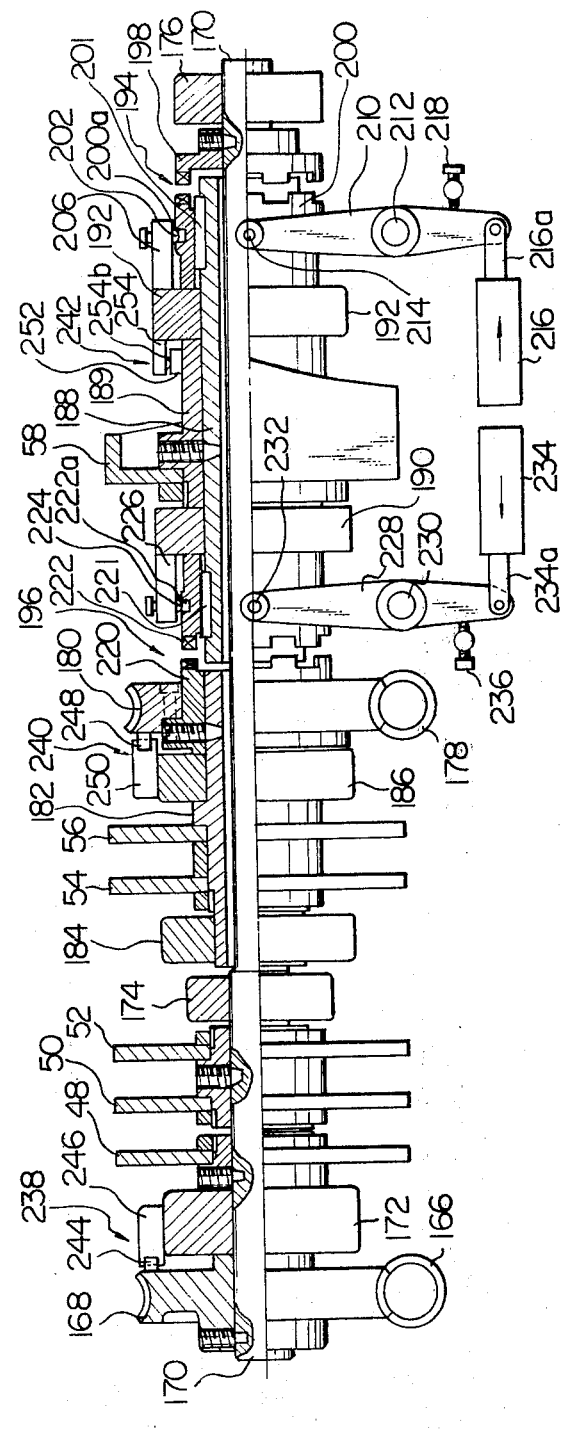
FIG. 8 is a schematic view, partly in cross section, of driven means forming part of the automatic lathe shown in FIG. 2.
Figure 11:
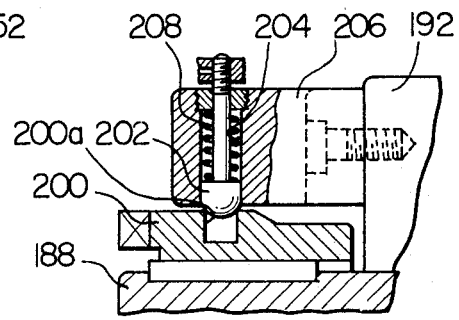

In accordance with an important feature of the present invention, an actuating mechanism which is generally designated as 160 comprises first and second numerically controlled drive means such as reversible pulse motors 162 and 164 in addition to the plurality of connecting mechanisms mentioned above. The pulse motors 162 and 164 are respectively controlled in response to numerical control signals received from the control system 20. As best shown in FIGS. 2 and 8, the pulse motor 162 is drivably connected through a worm gear 166 and worm wheel 168 to a first main cam shaft 170. The first main cam shaft 170 is rotatably supported by bearings 172, 174 and 176 mounted on the frame provided on the bed 12 and carries the master cams 48, 50 and 52 for the vertically or radially movable tool holders 80, 82 and 84 (see FIG. 3). Thus, the master cams 48, 50 and 52 are driven by the first pulse motor 162 through the first main cam shaft 170. The second pulse motor 164 is drivably connected through a worm gear 178 and worm wheel 180 to a second main cam shaft 182, through which the first cam shaft 170 longitudinally extends. The second main cam shaft 182 is rotatably supported by bearings 184 and 186 mounted on the frame (not shown) and carries thereon the master cams 54 and 56 for the radially movable tool holders 26 and 28 mounted on the rocking arm 30. Thus, the master cams 54 and 56 and accordingly the tool holders 26 and 28 are driven by the second pulse motor 164. At least one auxiliary or third cam shaft 188 is also provided in concentric relation with the first and second main cam shafts 170 and 182. The third cam shaft 188 is rotatably supported by bearings 190 and 192 mounted on the frame (not shown) and carries at its intermediate position the master cam 58 by means of a collar 189 for the horizontally movable tool holder 32. The third cam shaft 188 may be coupled to either one of the first and second cam shafts 170 and 182 and selectively driven by one of the first and second pulse motor 162 and 164. To this end, a clutch means is provided for selectively providing drive connections between the first cam shaft 170 and the third cam shaft 188 and between the third cam shaft 188 and the second cam shaft 182. The clutch means is comprised of a first dog clutch 194 provided between the first cam shaft 170 and the third cam shaft 188, and a second dog clutch 196 provided between the second cam shaft 182 and the third cam shaft 188. The first dog clutch 194 comprises a clutch element 198 fixedly connected to the right end of the first cam shaft 170, and a collar 200 slidably disposed on the third cam shaft 188 by a key 201. The collar 200 is formed with an annular recess 200a with which a stopper pin 202 usually engages. As best shown in FIG. 11, the stopper pin 202 is slidably disposed in a bore 204 formed in a support 206 fixed to the bearing 192 and urged downward by means of a compression spring 208. Thus, the stopper pin 202 engages with the annular recess 200a of the collar 200 and holds the collar in place. The dog clutch 194 thus arranged is actuated by an actuating arm 210 supported by a pivot shaft 212. The actuating arm 210 carries at its upper end an engaging pin 214 held engagement with the annular recess 200a of the collar 200. The lower end of the actuating arm 210 is connected to a movable plunger 216a of an actuator such as a solenoid 216 and electromagnetically controlled. The solenoid 216 is energized in response to an actuating signal received from the control system 20. Indicated as 218 is a stop serving as a positioning member for the actuating arm 210. With this arrangement, when the solenoid 216 is energized, the plunger 216a is retracted thereby rotating the actuating arm 210 clockwise so that the collar 200 is moved rightward as viewed in FIG. 8 against the force of the spring acting on the stopper pin 202 and, consequently, the clutch 194 is coupled to connect the third cam shaft 188 to the first cam shaft 170. Normally, however, the solenoid 216 is de-energized so that the plunger 216a protrudes to cause the actuating arm 210 to abut against the stop 218 by which the clutch 194 is kept in its uncoupled condition. Likewise, the second clutch 196 comprises a clutch element 220 fixedly connected to the second cam shaft 182, and a collar 222 slidably disposed on the left end of the third cam shaft 188 by a key 221. The collar 222 is formed with an annular recess 222a with which a stopper pin 224 engages for holding the collar 222 in its inoperative position. The stopper pin 224 is slidably disposed in a bore (not shown) formed in a support 226 fixed to the bearing 190 and urged downward by a compression spring (not shown). An actuating arm 228 is supported by a pivot pin 230 and carries at its upper end a pin 232 which engages with the annular recess 222a. The actuating arm 228 is connected at its lower end to a plunger 234a of an actuator such as a solenoid 234 and electromagnetically controlled. The solenoid 234 is energized in response to an actuating signal received from the control system 20. With this arrangement, when the solenoid 234 is energized, the plunger 234a is retracted thereby rotating the actuating arm 228 counter-clockwise and, accordingly, the collar 222 is moved leftward against the force of the compression spring (not shown) acting on the stopper pin 224. Thus, the clutch 196 is coupled and, therefore, the third cam shaft 188 is driven by the second drive means 164 through the second cam shaft 182. When, however, the solenoid 234 is de-energized, the plunger 234a protrudes thereby rotating the actuating arm 228 clockwise until the actuating arm 228 abuts against a stop 236 and the stopper pin 224 engages with the annular recess 222a to hold the collar 222 in its inoperative position.

Figure 9:
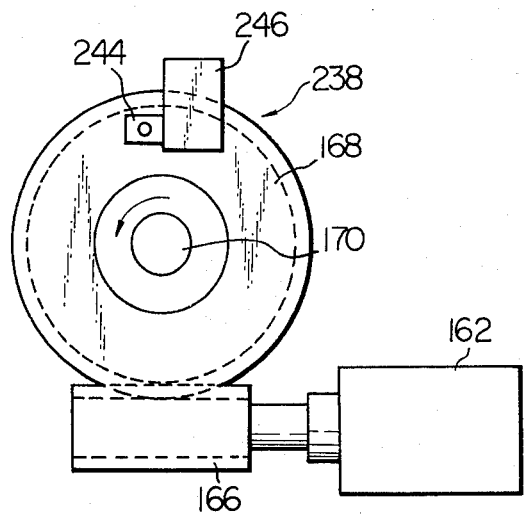
FIGS. 9 through 11 are schematic enlarged views of parts of the driven means shown in FIG. 8.
Figure 10:
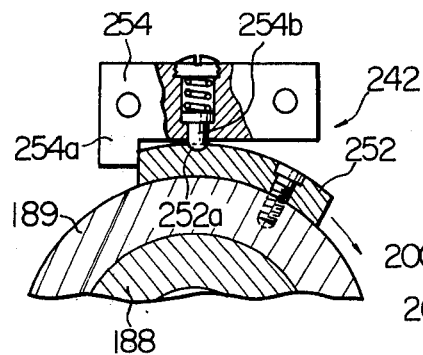

In order to provide predetermined angular starting positions of the first, second and third cam shafts 170, 182 and 188, the first, second and third cam shafts 170, 182 and 188 includes positioning means 238, 240 and 242, respectively. As best shown in FIGS. 8 and 9, the positioning means 238 is comprised of an engaging member 244 carried on the worm wheel 168 and a stopper plate 246 fixedly mounted on the bearing 172. With this arrangement, the initial or starting position of the worm wheel 168 or the first cam shaft 170 is provided by the engaging member 244 bearing upon the stopper plate 246. Thus, when the pulse motor 162 is energized in response to the numerical control signal received from the control system 20, the worm gear 166 is rotated at given speed to cause the worm wheel 168 to rotate counter-clockwise as viewed in FIG. 9 so as to feed the tool holders toward the cutting point. When the cutting operation has been performed, the pulse motor 162 is energized in the reverse direction so as to rotate the worm wheel 168 clockwise until the engaging member 244 is caused to abut against the stopper plate 246 at which time the first cam shaft 170 is held in its original starting position and, therefore, the tool holders are held in their original or inoperative positions. Similarly, the positioning means 240 comprises an engaging member 248 carried on the worm wheel 180 connected to the second cam shaft 182 and a stopper plate 250 fixed to the bearing 186. The operation of the positioning means 240 is similar to that of the positioning means 238 and, therefore, a detail description of the same is herein omitted. As best shown in FIGS. 8 and 10, the positioning means 242 comprises an engaging member 252 in the form of a sector which is fixed to the outer periphery of the collar 189 fixedly mounted on the third cam shaft 188, and a stopper plate 254 fixed to the bearing 192. The stopper plate 254 has a flange 254a with which one face of the engaging member 252 is engageable when the third cam shaft is held in its starting position. The stopper plate 254 carries an engaging pin 254b urged downward by a spring (no numeral) to engage with an indent 252a formed in the engaging member 252. When the third cam shaft 188 and accordingly the collar 189 are rotated clockwise as shown by an arrow in FIG. 10, the engaging pin 254b is moved upward against the force of the spring (no numeral) and disengages from the indent 252a and at the same time the engaging member 252 disengages from the flange 254a. Thus, the third cam shaft 188 is capable of feeding the tool holder 32 (see FIG. 2) by means of the cam 58 and the arm lever 72. When the cutting operation has been completed, the third cam shaft 188 is rotated in the reverse direction, viz, counter-clockwise as viewed in FIG. 10 until the engaging member 252 engages with the flange 254a and the engaging pin 254b engages with the indent 252a by the action of the spring acting on the pin 254b. In this manner, the third cam shaft 188 is maintained in its original starting or predetermined angular position.

When, in operation, it is desired to actuate one of the vertically movable tool holders 80, 82 and 84, viz, the tool holder 82, the actuator 98 is energized in response to the actuating signal received from the control system 20. In this instance, the plunger 98a is caused to protrudes to bring the upper end 102a of the connecting rod 102 into engagement with the pin 104 so that a drive connection is established between the master cam 50 and the lever 92 engaging with the tool holder 82. Under this circumstance, the first pulse motor 162 is energized in a normal direction so that the first cam shaft 170 is rotated in the normal direction. Concurrently, the master cam 50 fixed to the first cam shaft 170 is rotated counter-clockwise as viewed in FIG. 6. In this condition, the motion of the master cam 50 is transmitted through the connecting rod 102 to the lever 92 thereby moving the tool holder 82 radially inward, viz, toward the cutting point of the workpiece 16. Thus, the cutting operation may be performed. After the cutting operation has been completed, the first pulse motor 162 is energized in its reverse direction so that the cam shaft 170 is rotated in the reverse direction until the engaging member 244 abuts against the stopper plate 246 as shown in FIG. 9. Thus, the tool holder 82 is returned to its original starting or predetermined angular position. Similarly, the tool holders 80 and 84 may be actuated by energizing the actuators 114 and 116 in response to the actuating signals received from the control system 20 thereby establishing drive connections between the master cam 48 and the lever engaging with the tool holder 80 and between the master cam 52 and the lever engaging with the tool holder 84.

When it is desired to actuate the tool holder 26 carried on the rocking arm 30, the actuator 134 connected to the control system 20 is energized so that the plunger 132 protrudes thereby rotating the shaft 128 slidably supported by the lever 126 fixed to the rocking arm 30. In this situation, the cam follower 130 is moved to a position to engage with the master cam 54. Since, in this instance, the cam follower 130 is forcibly resiliently held in engagement with the master cam 54 by means of the tension spring 122, the rocking arm 30 is rotated clockwise as viewed in FIG. 4 when the second pulse motor 164 is energized in response to the numerical control signal from the control system 20 and, therefore, the tool holder 26 is radially moved toward the cutting point of the workpiece 16. On the contrary, when it is required to actuate the tool holder 28, the actuator 136 is energized in response to the actuating signal from the control system 20 with the actuator 134 de-energized. In this condition, the plunger 136a is retracted thereby rotating the stop 140 counter-clockwise as viewed in FIG. 5. If, in this situation, the second pulse motor 164 is energized, the second cam shaft 182 is rotated counter-clockwise as viewed in FIG. 5 so that the rocking arm 30 is also rotated in the same direction and, therefore, the tool holder 28 is radially moved inward, viz, toward the cutting point of the workpiece 16. After the cutting operation has been completed by the tool holder 26 or 28, the second pulse motor 164 is energized in its reverse direction so that the second cam shaft 182 is rotated in the reverse direction until the engaging member 248 abuts against the stopper plate 250 fixed to the bearing 186 thereby moving the tool holder 26 or 28 to its original starting position in which the second cam shaft 182 is maintained in its predetermined angular position.

The horizontally movable tool holder 32 is actuated by energizing the actuator 154 in response to the actuating signal from the control system 20 and energizing one of the first and second clutches 194 and 196. When the actuator 154 is energized, the plunger 154a protrudes thereby rotating the cam follower 150 to its operative position as shown in FIG. 7 so that the drive connection is established between the master cam 58 and the lever 72 connected to the tool holder 32. If, in this condition, the first clutch 194 is coupled by energizing the actuator 216, the third cam shaft 188 is drivably connected to the first cam shaft 170 and, therefore, the tool holder 32 is driven by the first pulse motor 162. If, however, the second clutch 196 is coupled by energizing the actuator 234, the third cam shaft 188 is drivably connected to the second cam shaft 182 and, therefore, the tool holder 32 may be driven by the second pulse motor 164. When the third cam shaft 188 is rotated in its normal direction by either one of the first and second pulse motors 162 and 164, the collar 189 connected to the third cam shaft 188 is rotated clockwise as viewed in FIG. 10 and, in this instance, the lever 72 engaging with the master cam 58 is rotated counter-clockwise as viewed in FIG. 2 so that the tool holder 32 is horizontally fed toward the workpiece 16. After the cutting operation has been completed, the third cam shaft 188 and accordingly the collar 189 fixed thereto are rotated counter-clockwise as viewed in FIG. 10 by energizing either one of the first and second pulse motors 162 and 164 in its reverse direction. In this condition, the engaging member 252 fixed to the collar 189 is caused to abut against the adjacent face of the flange 254a of the stopper plate 254 and, thus, the third cam shaft 188 and, accordingly, the tool holder 32 are returned to their original positions.

When, now, it is desired to concurrently actuate one of the vertically movable tool holders 80, 82 and 84 and the horizontally movable tool holder 32, one of the actuators 114, 98 and 116 corresponding to desired one of the vertically movable tool holders 80, 82 and 84 is energized by delivering the actuating signal thereto from the control system 20. At the same time, the actuator 154 is energized to provide the drive connection between the master cam 58 and the lever 72. Under these circumstances, the third cam shaft 188 is drivably connected to the second cam shaft 182 by energizing the actuator 234 to couple the second clutch 196. Thus, the desired one of the vertically movable tool holders 80, 82 and 84 and the horizontally movable tool holder 32 are concurrently fed toward the cutting points of the workpiece 16 at given feed rates by the first and second pulse motors 162 and 164, respectively, in response to the numerical control signals from the numerical system 20.

When, further, it is desired to concurrently actuate one of the radially movable tool holders 26 and 28 and the horizontally movable tool holder 32, one of the actuators 134 and 136 corresponding desired one of the radially movable tool holders 26 and 28 and the actuator 154 are energized by delivering the actuating signals thereto from the control system 20. Under these circumstances, the third cam shaft 188 is drivably connected to the first cam shaft 170 by energizing the actuator 216 to couple the first clutch 194. Thus, the desired one of the radially movable tool holders 26 and 28 is fed toward the workpiece 16 by the second pulse motor 164, while, at the same time, the horizontally movable tool holder 32 is horizontally fed toward the workpiece 16 by the first pulse motor 162.

It will thus be understood that selected ones of a plurality of tool holders may be concurrently actuated by the first and second pulse motors 162 and 164 at given feed rates as determined by the numerical control signals removed from the control system 20 whereby the operating efficiency of the lathe is considerably increased.

While, in the illustrated embodiment mentioned hereinabove, the two tool holders have been described as being concurrently fed toward the workpiece, it should be noted that the two tool holders may be consecutively fed toward the workpiece in different phases. For example, one of the tool holders 26 and 28 may be fed toward a position near the workpiece 16 by the second cam shaft 182 when the first cutting operation of the workpiece 16 is performed by one of the tool holders 80, 82 and 84 driven by the first cam shaft 170. Accordingly, a second cutting operation can be immediately initiated by the one of the tool holders 26 and 28 driven by the second cam shaft 182 after the first cutting operation has been completed. During the second cutting operation, the third cam shaft 188 may be connected to the first cam shaft 170 so that the tool holder 32 may be fed toward the workpiece 16 to perform a third cutting operation such as drilling during the second cutting operation. In this manner, the operating efficiency of the automatic lathe is considerably increased.

Figure 12:
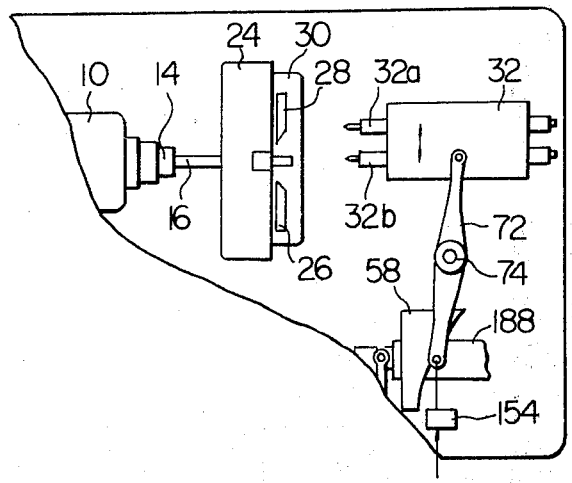
FIG. 12 is a fragmentary schematic view of a modified form of a part of the automatic lathe shown in FIG. 2.

A modified form of the horizontally movable tool holder 32 is fragmentarily shown in FIG. 12, in which like or corresponding component parts are designated by the same reference numerals as those used in FIG. 2. In this modified example, the horizontally movable tool holder 32 supports cutting tools 32a and 32b, one of which may be brought into operative condition by suitably rocking the tool holder 32 in one of the directions as shown by arrows in FIG. 12. This may be attained by supporting the tool holder 32 in a rocking arm (not shown), which may be rocked by some known suitable means such as a hydraulic cylinder (not shown) or a cam driving mechanism (not shown).

Figure 13:
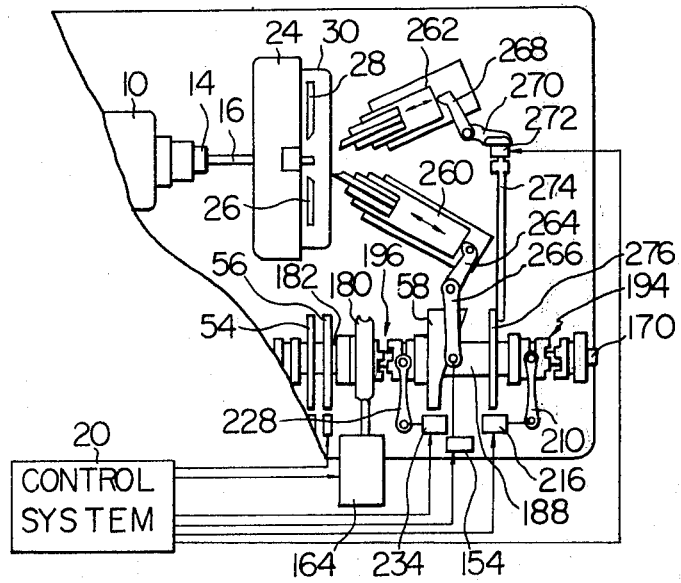
FIG. 13 is a fragmentary schematic view of another modified form of a part of the automatic lathe shown in FIG. 2.

A modified form of the automatic lathe is fragmentarily shown in FIG. 13 in which like or corresponding component parts are designated by the same reference numerals as those used in FIG. 2. In this illustrated form, the horizontally movable tool holder 32 is replaced by a set of tangentially movable tool holders 260 and 262. The tool holder 260 is connected to an actuating arm 264 which in turn is connected to an actuating lever 266 adapted to be actuated by the master cam 58 carried on the third cam shaft 188. Thus, when the actuating lever 266 is rotated counter-clockwise as viewed in FIG. 13, the actuating arm 264 is rotated in the same direction thereby pushing the tool holder 260 toward the cutting point of the workpiece 16. The connecting mechanism for the actuating lever 266 is identical to that of FIG. 7 and, therefore, a detail description of the same is herein omitted. The tool holder 262 is actuated by an actuating arm 268 which in turn is connected to an actuating lever 270. The actuating lever 270 is connected through an actuator 272 to a connecting rod 274 having its lower end engaging with a master cam 276 having a uniform-motion cam lobe and fixed on the third cam shaft 188. The drive connection between the connecting rod 274 and the actuating lever 270 is controlled by the actuator 272, which is controlled in response to a control signal received from the control system 20. When the actuator 272 is energized and the drive connection is established between the connecting rod 274 and the actuating lever 270, the motion of the master cam 276 is transmitted through the connecting rod 274 to the actuating lever 270 thereby rotating the actuating arm 268 in the directions as shown by arrows in FIG. 13 so that the tool holder 262 is moved toward and away from the cutting point of the workpiece 16.

Figure 14:
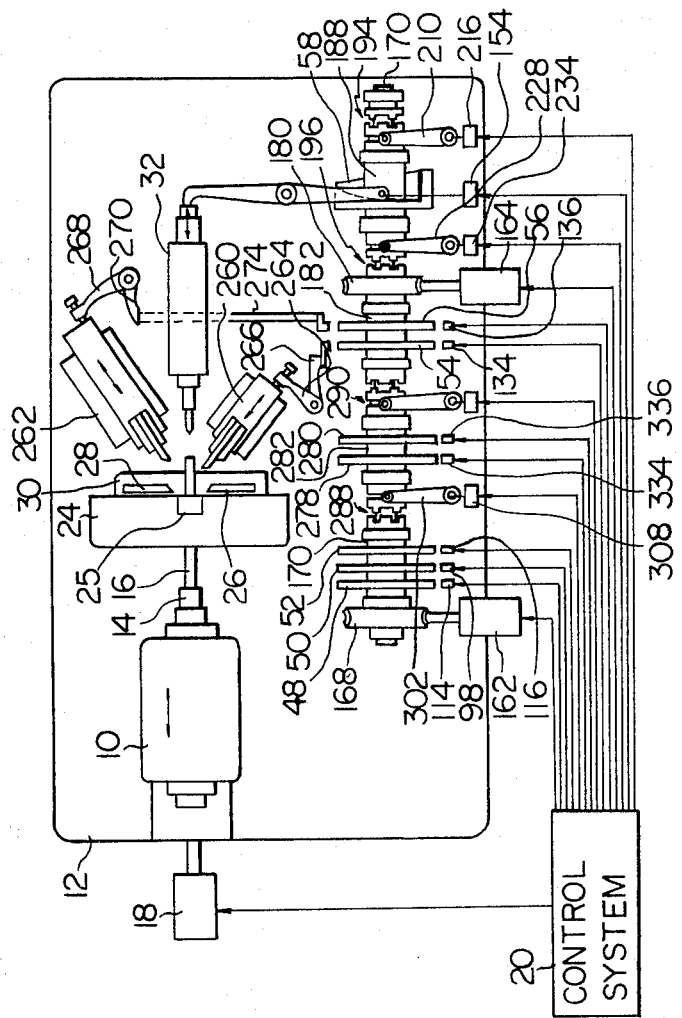
FIG. 14 is a schematic view of another preferred embodiment of a numerically controlled automatic lathe according to the present invention.
Figure 16:
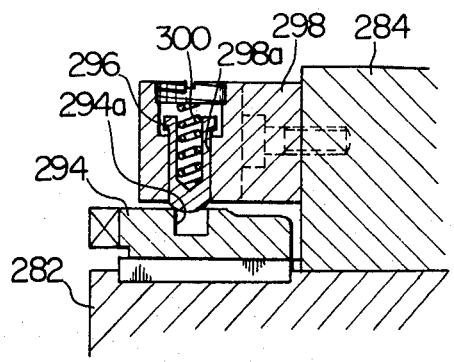
FIGS. 16 and 17 are fragmentary sectional views showing parts of the driven means shown in FIG. 15.
Figure 17:
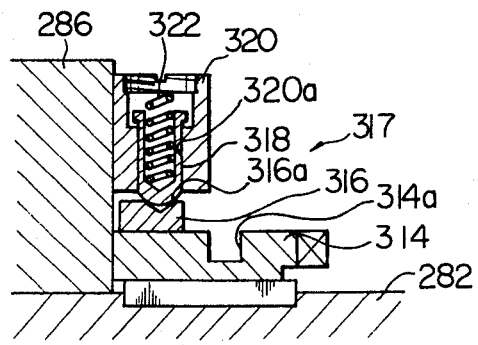

Another preferred embodiment of the automatic lathe according to the present invention is illustrated in FIGS. 14 through 17, in which like or corresponding component parts are designated by the same reference numerals as those used in FIGS. 2 through 13. This illustrated embodiment is similar to the first preferred embodiment except for that an additional set of tangentially movable tool holders 262 and 264 identical to those of FIG. 13 are provided which are arranged to be actuated by the master cams 54 and 56, respectively, associated with the actuators 134 and 136 connected to the control system 20. Instead, the radially movable tool holders 26 and 28 mounted on the rocking arm 30 are arranged to be actuated by master cams 278 and 280 having uniform-motion cam lobes and carried on a fourth hollow cam shaft 282 through which a portion of the first cam shaft 170 longitudinally extends. As best shown in FIG. 15, the fourth cam shaft 282 is rotatably supported by bearings 284 and 286 and may be drivably connected to either one of the first and second cam shafts 170 and 182 by third and fourth dog clutches 288 and 290. The third dog clutch 288 comprises a clutch element 292 fixed to the first cam shaft 170 and a collar 294 slidably disposed on the fourth cam shaft 282 by a key connection. As best shown in FIG. 16, the collar 294 is formed with an annular recess 294a with which an engaging member 296 engages. The engaging member 296 is slidably disposed in a bore 298a formed in a support 298 fixed to the bearing 284 and urged downward by means of a compression spring 300. Thus, the collar 294 is retained from its axial movement by the engaging member 296. To actuate the dog clutch 288, an actuating lever 302 is provided which is supported by a pivot shaft 304 and carries at its upper end a pin 306 engaging with the annular recess 294a of the collar 294. The lower end of the actuating lever 302 is connected to a movable plunger 308a of an actuator such as a solenoid 308, which is connected to and controlled by the control system 20 as shown in FIG. 14. Indicated as 310 is a stop which limits the excessive clockwise rotation of the actuating lever 302. If the solenoid 308 is energized in response to the actuating signal from the control system 20, the plunger 308a is retracted thereby rotating the actuating lever 302 counter-clockwise so that the collar 294 is moved toward the clutch element 292 against the force of the compression spring 300 acting on the engaging member 296 engaging with the annular recess 294a. Thus, the third clutch 288 is engaged and, therefore, the fourth cam shaft 282 is drivably connected to the first cam shaft 170. If, however, the solenoid 308 is de-energized, the plunger 308a protrudes until the actuating lever 302 abuts against the stop 310 thereby disengaging the third clutch 288. Similarly, the fourth dog clutch 290 comprises a clutch element 312 fixed to the left end of the second cam shaft 182, and a collar 314 slidably disposed on the fourth cam shaft 282 by a key connection. The collar 314 is formed with an annular recess 314a and provided with an engaging member 316 forming part of a positioning means 317 for providing a predetermined angular position of the fourth cam shaft 282 and having an indent 316a. A stop pin 318 is slidably disposed in a bore 320a formed in a support 320 fixed to the bearing 286 and urged downward by means of a compression spring 322 so that the stop pin 318 engages with the indent 316a of the engaging member 316 to maintain the fourth cam shaft 282 in its predetermined angular position. An actuating lever 324 is supported by a pivot shaft 326 and carries at its upper end a pin 328 engaging with the annular recess 314a of the collar 314. The lower end of the actuating lever 324 is connected to a movable plunger 330a of an actuator such as a solenoid 330, which is connected to and controlled by the control system 20 (see FIG. 14). Indicated as 332 is a stop which limit the excessive counter-clockwise rotation of the actuating lever 324. If the solenoid 330 is energized in response to an actuating signal from the control system 20, the plunger 330a is retracted thereby rotating the actuating lever 324 so that the collar 314 is moved toward the clutch element 312 against the force exerted on the collar 314 by the stop pin 318 engaging with the collar 314 through the engaging member 314 so that the fourth clutch 290 is engaged to drivably connect the fourth cam shaft 282 to the second cam shaft 182. If, however, the solenoid 330 is de-energized, the plunger 330a protrudes thereby rotating the actuating lever counter-clockwise until the lever 324 abuts against the stop 332. In this condition, the collar 314 is moved away from the clutch element 312 and, therefore, the fourth dog clutch 290 is disengaged to disconnect the fourth cam shaft 282 from the second cam shaft 182. The master cams 278 and 280 fixed to the fourth cam shaft 282 thus arranged are associated with actuators 334 and 336 which are associated with connecting mechanisms similar to those shown in FIGS. 4 and 5 to actuate the tool holders 26 and 28. The connecting mechanisms and associated parts for the other tool holders are also similar in construction as those shown in FIGS. 2 through 13 and, therefore, a detail description of the same is herein omitted for the sake of simplicity of description.

When, in operation, it is desired to concurrently actuate one of the vertically movable tool holders (not shown) and one of the tangentially movable tool holders 262 and 264, the first cam shaft 170 is driven by the first pulse motor 162 while the second cam shaft 182 is driven by the second pulse motor 164. It should be understood in this instance that selected one of the actuators 98, 114 and 116 associated with the master cams 48, 50 and 52 carried on the first cam shaft 170 is energized while another selected one of the actuators 134 and 136 associated with the master cams 54 and 56 is energized.

When it is desired to concurrently actuate one of the vertically movable tool holders and the horizontally movable tool holder 32, the third cam shaft 188 is drivably connected to the second cam shaft 182 by engaging the second clutch 196 while energizing the first and second pulse motors 162 and 164. It should be appreciated in this instance that desired one of the actuators 98, 114 and 116 is energized while the actuator 154 is energized.

One of the radially movable tool holders 26 and 28 and another one of the tangentially movable tool holders 262 and 264 may be concurrently actuated by energizing one of the actuators 334 and 336 while energizing one of the actuators 54 and 56. In this instance, the fourth cam shaft 282 is drivably connected to the first cam shaft 170 by engaging the clutch 288 so that the fourth cam shaft 282 is driven by the first pulse motor 162, whereas the second cam shaft 182 is driven by the second pulse motor 164.

One of the radially movable tool holders 26 and 28 and the horizontally movable tool holder 32 may be concurrently actuated by connecting the fourth cam shaft 282 to either one of the first and second cam shafts 170 and 182 and connecting the third cam shaft 188 to remaining one of the first and second cam shafts 170 and 182. It should be noted that one of the actuators 334 and 336 and the actuator 154 are energized in response to the actuating signals from the control system 20.

It is to be noted that in the illustrated embodiment of FIG. 14 selected ones of the tool holders may be consecutively actuated in different phases in a manner as already mentioned hereinabove. For example, one of the tool holders 260 and 262 is fed toward a position near the cutting area of the workpiece 16 by rotating the second cam shaft 182. Consequently, second cutting operation can be immediately initiated by the second cam shaft 182 after the first cutting operation has been completed by the first cam shaft 170. During the second cutting operation, the tool holder 32 is fed toward a position near the cutting area of the workpiece 16 by the third cam shaft 188 drivably connected to the first cam shaft 170 and, accordingly, third cutting operation can be immediately initiated by the third cam shaft 188 after the second cutting operation has been completed. During the third cutting operation, one of the tool holders 26 and 28 is fed toward a position near the cutting area of the workpiece 16 by the fourth cam shaft 282 drivably connected to the second cam shaft 182 and, thus, fourth cutting operation can be immediately initiated after the third cutting operation has been completed by the third cam shaft 188. In this manner, the cutting operations may be consecutively performed within the shortest period of time.

It will now be appreciated from the foregoing description that in accordance with the present invention selected ones of a plurality of tool holders may be concurrently actuated at given feed rates by separate numerically controlled drive means whereby operating efficiency of an automatic lathe is significantly increased.

It should further be understood that in a numerically controlled automatic lathe of the present invention desired one of a plurality of tool holders may be fed to a position near the cutting point of a workpiece even when cutting operation is performed by another one of the tool holders and, therefore, it is possible to immediately initiate next cutting operations in a consecutive manner whereby the operating time for completing the cutting operations can be significantly reduced.

Since, further, desired ones of the plurality of tool holders can be automatically selected by controlling the operations of actuators in response to actuating signals received from a control system, it is easy to automatically perform various cutting operations on a programmed basis and simplify the manipulation of the automatic lathe.

It should also be noted that a tool actuating mechanism forming part of the automatic lathe is simple in construction, easy to manufacture and highly reliable in operation.

While the present invention has been shown and described with reference to preferred embodiments, it should be understood that various changes and modifications may be made without departing from the scope of the present invention. For example, if the auxiliary or third cam shaft 188 carries only one master cam 58, the actuator 154 may be dispensed with and arrangement may be made such that the tool holder 32 associated with the master cam 58 is actuated by merely energizing one of the actuators 216 and 234.

What is claimed is:

1. A numerically controlled automatic lathe comprising, in combination: a headstock having a rotatable spindle to support a workpiece; a plurality of tool holding means movable toward and away from said workpiece; numerically controlled first and second drive means; a first main cam shaft drivably connected to said first drive means; a second main cam shaft drivably connected to said second drive means; at least one auxiliary cam shaft drivably connectable to one of said first and second main cam shafts; a plurality of master cams having uniform-motion cam lobes and carried on said first, second and auxiliary cam shafts; a plurality of connecting means connected to said plurality of tool holding means, respectively; first means for selectively providing drive connections between those of said plurality of master cams carried on said first and second main cam shafts and corresponding ones of said connecting means; and second means for selectively drivably connecting said auxiliary cam shaft to said one of first and second main cam shafts; said first and second means being operative to drivably connect selected ones of said plurality of master cams to corresponding ones of said plurality of tool holding means whereby selected ones of said plurality of tool holding means may be concurrently fed toward said workpiece at given feed rates.

2. A numerically controlled automatic lathe according to claim 1, in which said first and second main cam shafts and said auxiliary cam shaft are disposed in concentric relationship with respect to each other.

3. A numerically controlled automatic lathe according to claim 1, further comprising positioning means for determining a predetermined angular position of said auxiliary cam shaft.

4. A numerically controlled automatic lathe according to claim 1, in which said headstock is operatively connected to numerically controlled feed means by which said headstock is horizontally movable along the axis of said spindle on a numericially controlled basis.

5. A numerically controlled automatic lathe according to claim 1, in which said first means includes electrically controlled actuators disposed between those of said plurality of master cams carried on said first and second main cam shafts and corresponding ones of said plurality of connecting means.

6. A numerically controlled automatic lathe according to claim 1, in which said second means includes clutch means for selectively drivably connecting said auxiliary cam shaft to said one of first and second main cam shafts, and electrically controlled actuators operatively connected to said clutch means for selectively engaging and disengaging said clutch means.

7. A numerically controlled automatic lathe according to claim 6, in which said second means further includes at least one electrically controlled actuator disposed between at least one of said plurality of master cams carried on said auxiliary cam shaft and corresponding one of said plurality of connecting means and operative to selectively provide drive connection therebetween.

8. A numerically controlled automatic lathe according to claim 6, in which each of said electrically controlled actuators includes a solenoid.

9. A numerically controlled automatic lathe according to claim 1, further comprising positioning means for determining predetermined angular positions of said first and second main cam shafts.

* * * * *